United States Patent [19]
Casey

[11] 3,740,594
[45] June 19, 1973

[54] PERMANENT-ELECTROMAGNETIC RECIPROCATING DEVICE

[75] Inventor: Gerald F. Casey, Los Angeles, Calif.

[73] Assignee: Fema Corporation, Pacioma, Calif.

[22] Filed: Aug. 30, 1971

[21] Appl. No.: 175,924

[52] U.S. Cl. .................................................. 310/30
[51] Int. Cl. ......................................... H02k 33/12
[58] Field of Search .................. 310/23, 24, 30, 34, 310/35, 155, 266, 12-19; 335/229, 234

[56] References Cited
UNITED STATES PATENTS
3,022,450   2/1962   Chase, Jr. ....................... 335/229 X
3,462,626   8/1969   Kluss.............................. 310/266 X Primary Examiner—D. F. Duggan
Attorney—Harry Kotlar and Lewis B. Sternfels

[57] ABSTRACT

The device, configured to have a small width with respect to its length in the direction of armature movement, comprises a long tubular, radially magnetized permanent magnet coaxially surrounding a long length armature to provide a large circumferential area of the armature. The permanent magnet and the armature are closely spaced along their facing lengths to provide a small annular gap therebetween. The large area compensates for the size of the gap and permits placement of an electro-magnetic coil in the gap.

11 Claims, 9 Drawing Figures

PERMANENT-ELECTROMAGNETIC RECIPROCATING DEVICE

The present invention relates to a permanent magnet-electromagnetic device and, in particular, to such device having a large length and a small width.

Magnetic devices of the type described herein are known in the prior art. For example, copending patent application, Ser. No. 885,098, filed Dec. 15, 1969, now U.S. Pat. No. 3,604,959, patented Sept. 14, 1971, entitled "Linear Motion Electro-Mechanical Device Utilizing Non-Linear Elements" by Oded E. Sturman, assigned to the assignee of the present application, discloses a device having a permanent magnet with an axial magnetic field. An electromagnetic coil is coaxially disposed with respect to the permanent magnet and its flux lines must pass in part through the permanent magnet. The armature of this device reciprocates along the axis of the two magnets. Although this device works well, its diameter, which is perpendicular to the axis, must be large to minimize flux leakage, and the electromagnetic flux lines must pass through the relatively poor path of the permanent magnet. The former condition makes it difficult to place several such devices adjacent to each other within a limited space in which several reciprocating outputs must be obtained. The latter condition does not provide for the most efficient utilization of the electromagnetic flux lines.

Furthermore, in this as well as other prior art devices, the elements are not symmetrically placed. Thus, changes in temperature, which can affect magnetic force output, will produce changes in operation of these devices.

Other prior art devices utilize a pair of permanent magnets with a common center pole and a pair of electro-magnets disposed on either side of the pole. The disadvantage of such devices is in the requirement for two electromagnets and appropriate power source connections.

The present invention overcomes these and other problems by providing a symmetry and economy of design, including a single permanent magnet and a single electro-magnet whose axial lengths are great with respect to their diametrical dimensions. Both magnets are disposed about an axially moving armature, also of great length but of minimum diameter.

The internal circumference of the permanent magnet is closely spaced from the circumference of the armature and the coil of the electromagnet is placed in this space. As a consequence, the circumferential area of the armature is large to maximize permeability of the gap, and the smallness of the coil diameter enables less length of wire with corresponding smallness of wire resistance per turn.

The permanent magnet is radially magnetized so as to provide two oppositely directed flux paths flowing from the center of the armature toward its ends, through a pair of end pole pieces and back through an external shell to the permanent magnet. The electromagnet is energizable to provide, by simple switching means, flux paths which are directed in one or the other direction along the entire length of the armature to reinforce one portion of the permanent magnet lines and to oppose the other portion thereof. This electromagnetic flux path also follows the armature and the end pole pieces, and is completed by a cover of ferromagnetic material encircling the permanent magnet. Movement of the armature occurs when current through the coil is reversed. A spring aids the armature and is capable of providing a center armature position or to obtain a proportional device when matched to permanent magnet-electromagnet force fields.

It is, therefore, an object of the present invention to provide a narrow body, long length permanent magnet-electromagnet device.

Another object is a provision of such a device having high magnetic efficiency.

Another object is to provide such a device having few elements.

Another object is the provision of such a device having a rectilinear motion output which is polarity sensitive.

Another object is the provision of such a device having a rectilinear motion output capable of being power driven in alternate directions without the use of springs.

Another object is to provide such a device having a rectilinear motion output whose position is proportional to coil current.

Another object is the provision of such device having a force output proportional to coil current.

Another object is to provide such a device having a rectilinear output motion which is capable of being held in any selected position depending upon the level of coil current.

Another object is the provision of such a device having a direct rectilinear output motion with high force capability with respect to input power through the algebraic summing of permanent and electromagnetic fields.

Another object of the present invention is to provide a positioning device capable of three discrete positions depending upon the direction of electromagnetic flux or the lack thereof.

Other aims and objects, as well as a more complete understanding of the present invention, will appear from the following explanation of exemplary embodiments and the accompanying drawings thereof, in which:

Figure 1:
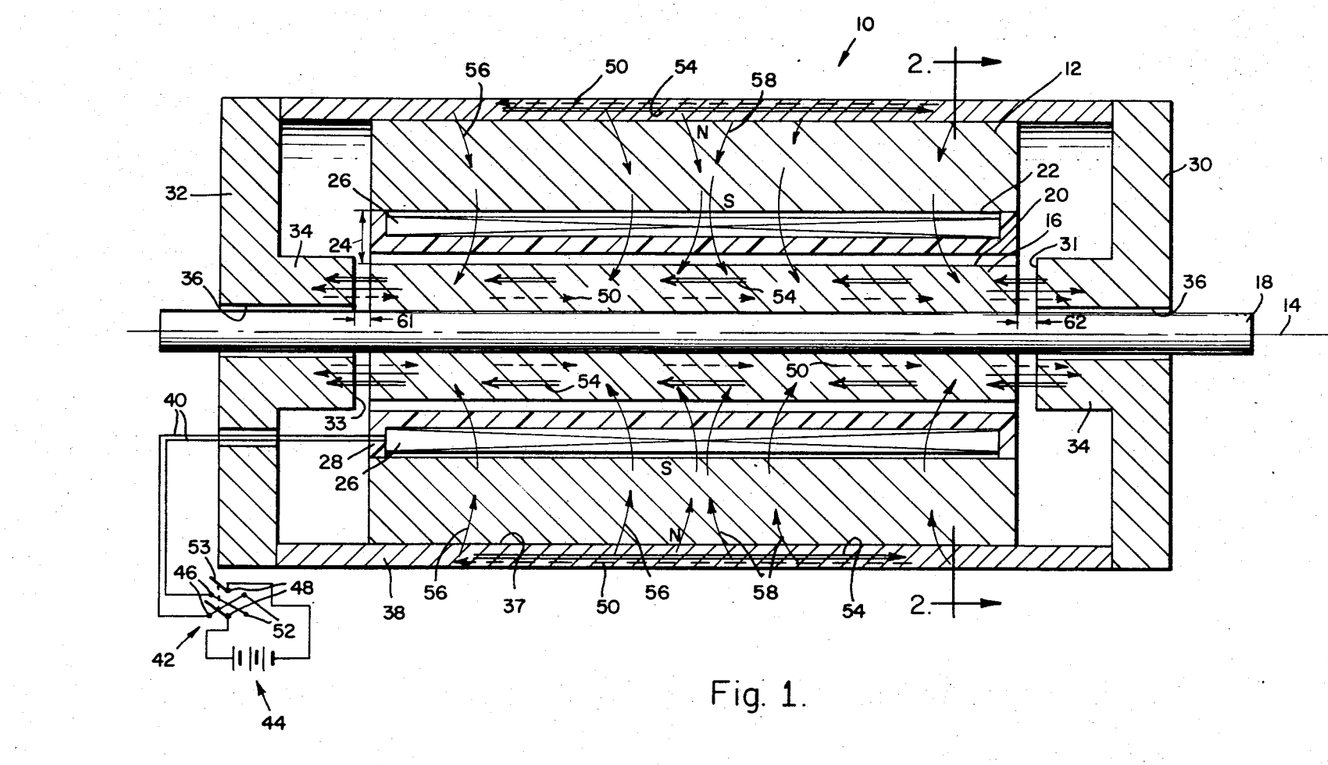
FIG. 1 is a cross-sectional view taken along the axis of a first embodiment of the present invention.
Figure 2:
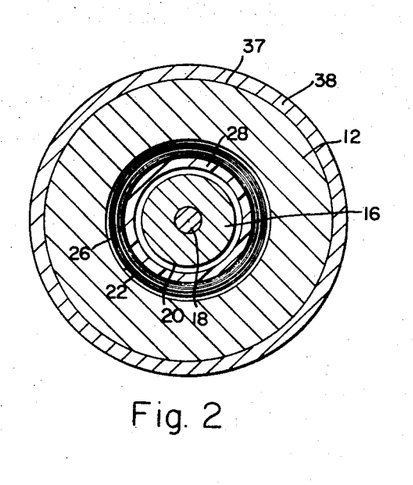
FIG. 2 is a cross-sectional view taken perpendicular to the axis of the embodiment of FIG. 1 taken along lines 2—2 thereof.

Accordingly, with reference to FIGS. 1 and 2, a permanent magnet, electromagnetic device 10, having an axis 14, comprises a permanent magnet 12 of annular shape having a radial magnetization as noted by poles "N" and "S." Permanent magnet 12 may be made of a single tubular piece or several pieces of arcuate shape which, when assembled, forms a tube. The length of the permanent magnet along axis 14 is usually greater than its greatest diameter between its north poles. The permanent magnet surrounds an armature 16 of ferromagnetic material which is secured to an output shaft 18 by suitable means. The output shaft is formed of a non-magnetic material. The length of armature 16 is approximately as long as the length of the permanent magnet to provide a large area circumference 20.

The permanent magnet has an internal cylindrical surface 22 which is closely spaced from armature surface 20 to provide a gap 24 therebetween. Within this gap of small dimension but of great length and area is positioned an electromagnet coil 26 of annular shape. The coil is wound on a non-magnetic core 28 of substantial tubular shape.

As a consequence, a single permanent magnet, electromagnet, and armature are provided by the present invention. Enclosing the two magnets and the armature are a pair of end pieces 30 and 32 of ferromagnetic material each having inwardly turned bosses 34 to provide a bore 36 for reception and support of shaft 18 and pole pieces 31 and 33 which also can terminate movement of armature 16. Securing together end pieces 30 and 32 and permanent magnet 12 at its outer circumference 37 is a tubular housing or shell 38 which, like the end pieces, is of ferromagnetic material.

Extending from electromagnetic coil 26 are wires 40 which are connected through a double pole, double throw switch 42 to a power source 44, configured as a battery, although it is to be understood that an alternating source may be utilized in certain uses of the present invention.

Switch 42 is provided with contact pairs 46, 48 and 52 and a moveable arm 53. When the switch is connected to join contact pairs 46 and 48, the electromagnet coil is caused to become excited in a direction which, for purposes of description, is termed "plus current." This coil excitation provides a flux current as indicated by dashed arrow 50 moving through armature 16 toward the right, as viewed in FIG. 1, across the working air gap 62 through end piece 30 and returning toward the left-hand side of FIG. 1 through housing 38 and end piece 32 across working air gap 61 and back through the armature. Conversely, when switch contacts 48 and 52 are electrically coupled, electromagnetic flux current, for convenience of description, termed "minus current," moves in the direction as indicated by double shafted arrows 54, in a direction opposite to the current indicated by arrows 50. Permanent magnet 12, because it is a radially magnetized magnet, produces a permanent magnet flux which moves in paths 56 and 58 from the center of device 10 across working air gaps 61 and 62 toward respective pole pieces 30 and 32 and back through housing 38 so as to form two circular flux paths.

As a consequence, when electromagnet coil 26 is not energized, armature 16 is directionally bistable in that it will be attracted toward the closest pole piece due to net magnetic attraction in that direction caused by the lower reluctance in the shorter working air gap. Assuming that armature 16 is biased against pole piece 31 by this net force of the permanent magnet, upon energization of coil 26 such as by coupling between contacts 48 and 46, electromagnet flux path 50 re-enforces permanent magnet flux path 58 while bucking permanent magnet flux path 56. Therefore, armature 16 remains in contact with end 31. However, upon a coupling between contacts 48 and 52, the electromagnet flux current moves in the direction of arrows 54 which re-enforce permanent magnet flux path 56 while bucking flux path 58. As a consequence, the magnetic flux of the combined permanent and electromagnets exists through pole piece 33, and armature 16 is thereby urged into contact with end 33. Thus, the device of FIGS. 1 and 2 operates as a two position device.

Figure 3:
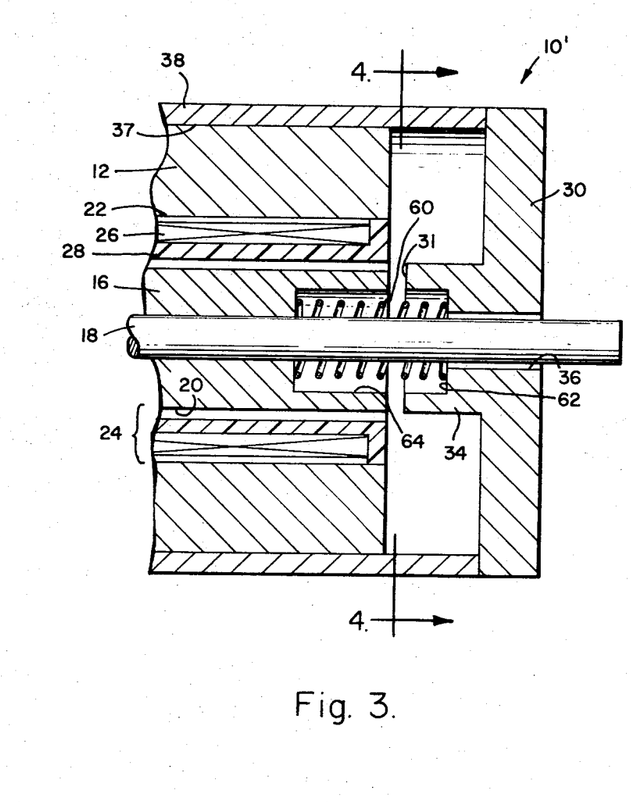
FIG. 3 is an axial cross-sectional view of a second embodiment of the present invention, partly in section.
Figure 4:
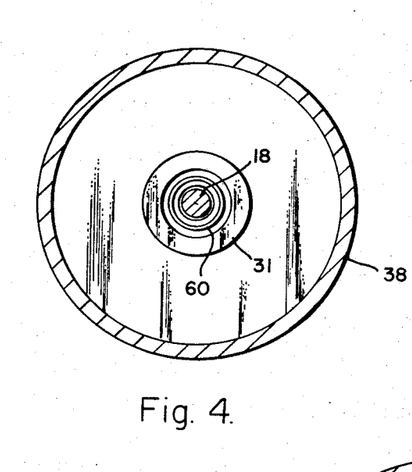
FIG. 4 is a radial cross-sectional view of the second embodiment depicted in FIG. 3 taken along lines 4—4 thereof.

Reference is now directed to device 10' of FIGS. 3 and 4 which is similar to that of FIGS. 1 and 2 with the addition of an external or internal spring rate device, such as a pair of springs 60 which may be housed within recesses 62 of the respective end pieces and a recess 64 in each end of the armature, or by a frictionless spring suspension system. Depending upon the end use of device 10', the spring rate may be obtained from the mechanism to which device 10' is coupled. Springs 60 may have linear or non-linear characteristics.

When device 10' operates as a three position device, that is, when electromagnetic coil 26 is not energized, springs 60 have sufficient counterbalancing forces to center armature 16 between pole pieces 31 and 33, despite the effects of the two forces of the permanent magnet.

Figure 5:
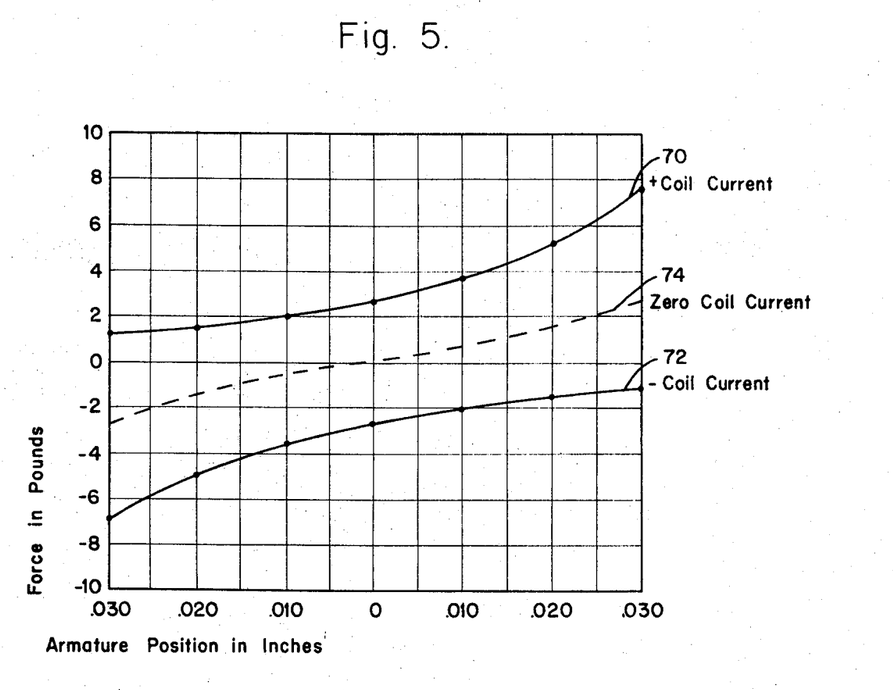
FIG. 5 is a graph of force versus armature position for various coil currents of the embodiment depicted in FIG. 1.

When used as a two position unit, the device of FIG. 1 produces a force versus armature position relationship for various coil currents as depicted in FIG. 5. Curve 70 depicts the force with coil current moving in a "plus" direction and shows electromagnetic force on the armature available to move the armature in one direction. When the electromagnetic coil current is reversed, the resulting force is depicted by curve 72 to provide a magnetic force on the armature available to move the armature in the direction opposite to the first direction. Curve 74 illustrates the forces on the armature when no coil current is provided.

Figure 6:
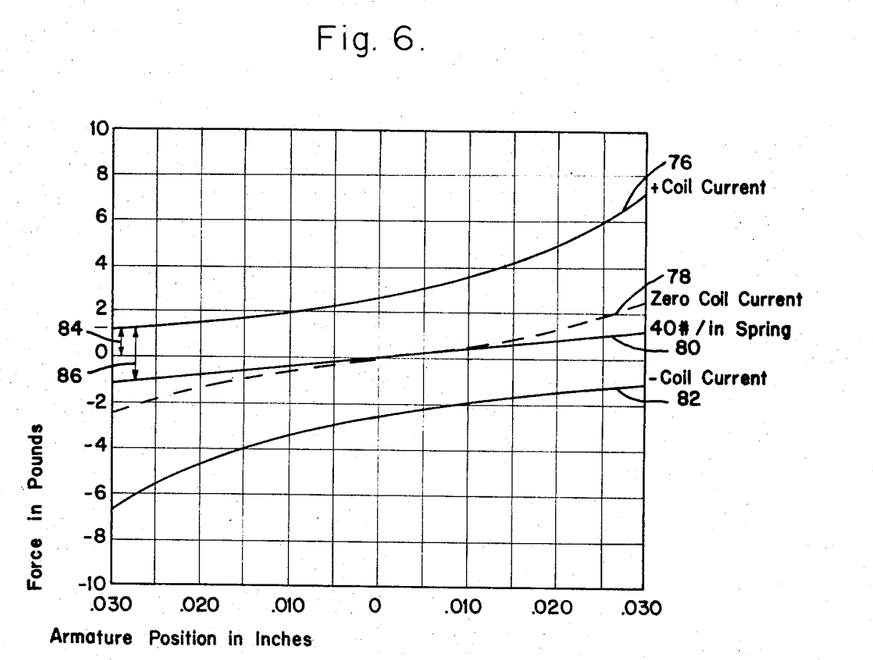
FIG. 6 is a graph depicting a comparison of force versus armature position for various coil currents with and without aiding springs of the embodiments of FIGS. 1 and 3.

When the present invention is utilized as a two position unit but with the aid of a weak spring having a rate less than the "zero" coil current magnetic spring rate, as depicted in FIG. 3, a series of curves 76, 78, 80 and 82 are obtained, as shown in FIG. 6. Curves 76 and 82 illustrate forces due to opposite flow of current through coil 26, similar to that described above with respect to FIG. 5. Curve 78 is the "zero" current force line while curve 80 depicts the mirror image of a spring force curve. This curve actually exists in the second and fourth quadrants but has been shown in mirror form in the first and third quadrants for purposes of comparing forces. As a comparison between using a device with no spring, the initial accelerating force using no springs is shown by distance 84 between the "zero" force line and curve 76. With the aid of a spring, the initial accelerating force increases to that as indicated by distance 86 between curves 76 and 80. Thus, by utilizing springs, movement of the armature is significantly increased.

Figure 7:
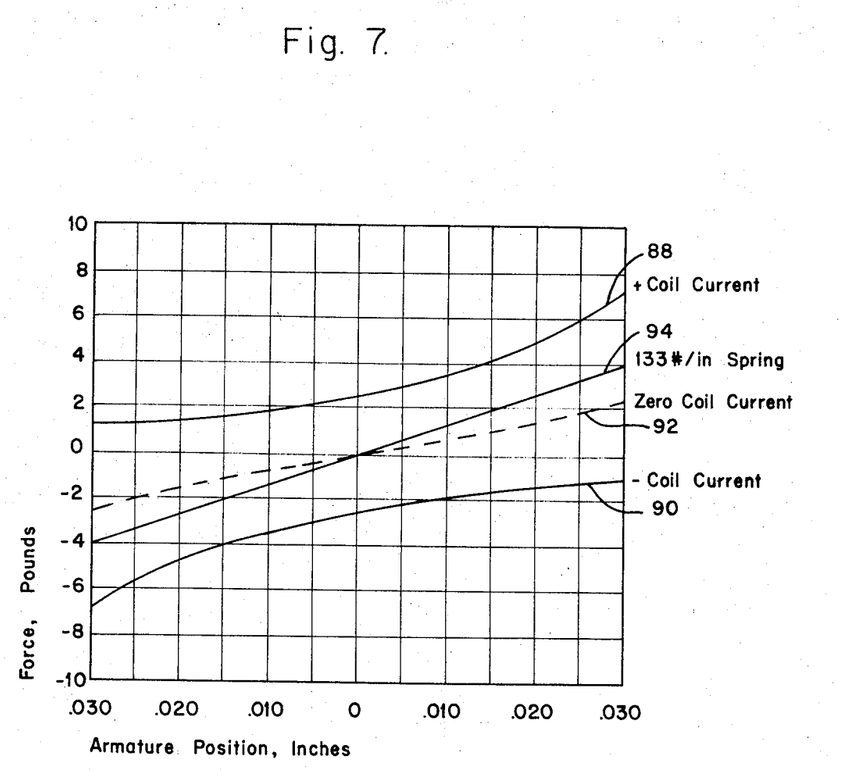
FIG. 7 is a graph showing force versus armature position for various coil currents of the embodiment depicted in FIG. 3.

Device 10' shown in FIG. 3, when utilized as a three position unit, provides a force versus armature position relationship with various coil currents shown in FIG. 7. In this Figure, curves 88 and 90 depict opposite energizations of the electromagnetic coil, curve 92 shows the "zero" coil current curve, and curve 94 is the mirror image of the spring bias curve. Here, the spring utilized is stronger than that utilized with respect to FIG. 6 in that its rate is greater than the "zero" coil current magnetic spring rate. As will be seen by comparing the slopes of curves 92 and 94, the armature tends to remain in the central position when no coil current is supplied. However, upon application of either direction of the coil current, there is sufficient electromagnetic force to overcome the bias of the spring so as to move the armature toward one end or the other of the device.

Figure 8A:
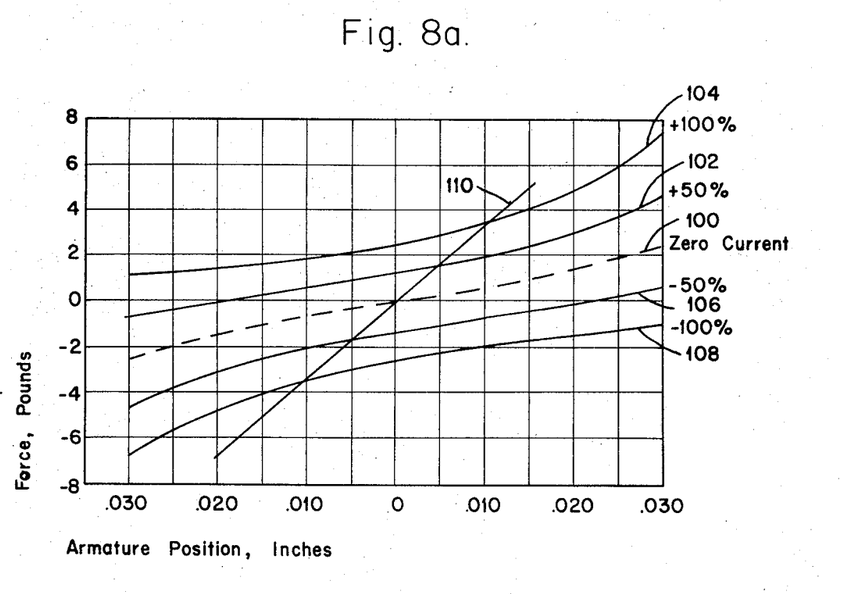
FIGS. 8a and 8b are graphs respectively illustrating force versus armature position for various coil currents, and position versus coil current utilizing a spring in a multiposition unit.
Figure 8B:
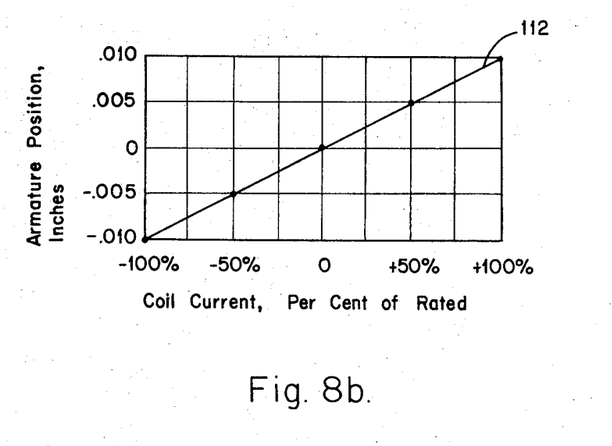

A multi-position unit can be obtained as shown with reference to FIGS. 8a and 8b in which curve 100 is the "zero" current force line, curves 102 and 104 are respectively force lines for 50 percent and 100 percent current application in a first "plus" direction and curves 106 and 108 show force lines for 50 percent and 100 percent current flow in the opposite "minus" direction. Curve 110 shows a mirror image of a linear spring curve. Depending upon the amount of current applied to coil 26, the position of the armature, as represented by curve 112 can be placed at any desired point. For example, at a 50 percent coil current as shown by curve 102, the armature position is 0.005 inches, as shown in FIG. 8b. This corresponds to a force of approximately 1.6 pounds (See FIG. 8a).

From the foregoing, it will be appreciated that use of the radially magnetized permanent magnet permits use of a large area, short length magnet in a device configuration which is long in its axial direction but small in diameter. By such an arrangement of components, a large area of the armature facing the interior of the magnet is provided. This large face-to-face arrangement provides a low reluctance path for the flux lines and a simple assembly with few parts because no soft iron path is required for conducting the flux from the inner surface of the magnet to the armature.

Furthermore, the device configuration permits the fullest and maximum use of the fewest number of elements, to wit, a single permanent magnet, a single electromagnetic coil, a single armature, and a complete ferromagnetic flux path. Since the envelope space for the coil is axially long and radially small, efficient coil configuration and use is obtainable due to a large number of coil turns of small diameter, resulting in less usage of wire and attendant decreased resistance per turn. As a consequence of utilizing a symmetrically positioned electromagnetic coil, bidirectional forces can be obtained simply by reversing the direction of coil current and permanent magnet latching of equal magnitude is available in two positions. As a further benefit of utilizing symmetrically placed elements, and flux paths, temperature and other environmental changes affecting the elements are counterbalanced to ensure constant operational conditions. However, by an intentional alteration of magnetic flux path areas or spring force-stroke characteristics, the symmetry of operation can be controllably changed.

Although the invention has been described with reference to particular embodiments thereof, it should be realized that various changes or modifications may be made therein without departing from the spirit and scope of the invention.

What is claimed is:

1. A magnetic device of symmetrical configuration and operation comprising:
   an elongated, right cylindrical armature of ferromagnetic material bounded by a pair of ends and a circumferencial surface and having a length sufficient to provide a large area circumference, said armature being rectilinearly translatable along its cylindrical axis, and said armature having output shafts extending axially from the ends;
   an elongated tubular permanent magnet surrounding said armature and coaxially positioned therewith and magnetized radially with respect to the axis, said permanent magnet having an internal cylindrical surface and an external cylindrical surface, said internal surface being closely spaced from said armature circumferencial surface throughout the large area thereof to provide a thin walled tubular gap means of minimum reluctance between said armature and said permanent magnet and to provide a pair of oppositely directed permanent magnet flux paths;
   an elongated coil positioned in said gap means and extending substantially throughout the circumferencial length of said armature and energizable to provide a single reversible flux path;
   a housing of ferromagnetic material secured to the external cylindrical surface at said permanent magnet, said housing including a pair of circular end plates with central opening means for journalled support of said armature output shafts, and said central opening means having bosses extending towards one another in spaced proximity from the ends of said armature to provide a pair of working gap means;
   whereby said armature is reciprocable upon energization of said electromagnet, the electromagnet flux path re-enforcing one of the oppositely directed permanent magnet flux paths and opposing the other of the oppositely directed permanent magnet flux paths, and said flux paths passing entirely throughout said housing and said armature.

2. A magnetic device as in claim 1 further including a pair of linear springs of equal force magnitude positioned between the respective bosses and armature ends to center said armature upon de-energization of said electromagnet.

3. A magnetic device as in claim 1 wherein the combination of said permanent magnet, said electromagnet, and the working gap provides a magnetic force-gap characteristic and further including springs positioned between the respective bosses and armature ends, the magnetic force-gap characteristic being related to the spring force-translation characteristics sufficient to provide specific positions of said armature in response to levels and polarities of energization of said electromagnet.

4. A magnetic device comprising:
   an armature of ferromagnetic material;
   a radially magnetized permanent magnet; and
   an electromagnetic coil ;
   said armature, said permanent magnet and said coil all being coaxially mounted, said armature having an outer periphery and said permanent magnet having an inner periphery spaced from said armature outer periphery to provide a gap, said coil mounted in the gap.

5. A magnetic device as in claim 4 wherein the axial lengths of said armature, said coil and said permanent magnet are greater than the widths thereof normal to the axis to provide a reduced length of coil wire per turn, thereby minimizing resistance through said coil and resulting in reduced power input necessary for obtaining force output.

6. A magnetic device as in claim 4 further including a pair of ferromagnetic pole pieces positioned at and spaced from the ends of said armature, said pieces having opening means therein disposed on the axis and said armature having force transmitting means extending through said opening means to the exterior of said device.

7. A magnetic device as in claim 4 further including bias means coupled to said armature.

8. A magnetic device comprising:
an armature of ferromagnetic material having an outer periphery;
a radially magnetized permanent magnet coaxially mounted about said armature and having an inner periphery spaced from said armature outer periphery to provide a gap;
an electromagnetic coil coaxially mounted about said armature and mounted in the gap;
a pair of ferromagnetic pole pieces positioned at and spaced from the ends of said armature, said pieces having opening means therein disposed on the axis and said armature having force transmitting means extending through said opening means; and
a housing of ferromagnetic material surrounding and in contact with said permanent magnet and secured to said pieces to provide, with said armature, a continuous magnetic flux path.

9. A magnetic device comprising:
an armature of ferromagnetic material having an outer periphery;
a radially magnetized permanent magnet coaxially mounted about said armature and having an inner periphery spaced from said armature outer periphery to provide a gap;
an electromagnetic coil coaxially mounted about said armature and mounted in the gap;
a pair of ferromagnetic pole pieces positioned at and spaced from the ends of said armature, said pieces having opening means therein disposed on the axis and said armature having force transmitting means extending through said opening means; and
bias means positioned between said armature and said pieces.

10. A magnetic device as in claim 9 wherein said bias means comprises linear springs.

11. A magnetic device as in claim 9 wherein said bias means comprises non-linear springs.

* * * * *